United States Patent
Breunig et al.

(10) Patent No.: US 11,960,256 B2
(45) Date of Patent: Apr. 16, 2024

(54) METHOD FOR OPERATING A PLURALITY OF DEVICES HAVING ELECTRICAL CONSUMERS OR GAS CONSUMERS, AND SYSTEM HAVING A PLURALITY OF SUCH DEVICES

(71) Applicants: RATIONAL Aktiengesellschaft, Landsberg am Lech (DE); RATIONAL International AG, Heerbrugg (CH)

(72) Inventors: Manfred Breunig, Schongau (DE); Florian Löw, Cernay (FR); Frank Marek, Klosterlechfeld (DE)

(73) Assignees: RATIONAL AKTIENGESELLSCHAFT, Landsberg am Lech (DE); RATIONAL INTERNATIONAL AG, Heerbrugg (CH)

( * ) Notice: Subject to any disclaimer, the term of this patent is extended or adjusted under 35 U.S.C. 154(b) by 792 days.

(21) Appl. No.: 16/473,025

(22) PCT Filed: Dec. 8, 2017

(86) PCT No.: PCT/EP2017/082053
§ 371 (c)(1),
(2) Date: Jun. 24, 2019

(87) PCT Pub. No.: WO2018/114403
PCT Pub. Date: Jun. 28, 2018

(65) Prior Publication Data
US 2019/0357309 A1 Nov. 21, 2019

(30) Foreign Application Priority Data
Dec. 23, 2016 (DE) .......................... 102016125572.6

(51) Int. Cl.
*G05B 15/02* (2006.01)
*F24C 7/08* (2006.01)
(Continued)

(52) U.S. Cl.
CPC .............. *G05B 15/02* (2013.01); *F24C 7/087* (2013.01); *H02J 3/14* (2013.01); *H05B 1/0258* (2013.01); *H02J 2310/14* (2020.01)

(58) Field of Classification Search
CPC ........ F24C 7/085; F24C 15/003; F24C 7/087; G05B 15/02; H02J 2310/14;
(Continued)

(56) References Cited

U.S. PATENT DOCUMENTS 6,549,818 B1 * 4/2003 Ali .......................... H05B 6/688
9,906,029 B2 * 2/2018 Grohman .......... H02J 13/00002
(Continued)

FOREIGN PATENT DOCUMENTS

CH   2061131 B1 * 5/2009 ............... H02J 3/14
CN   102715844 A   10/2012
(Continued)

*Primary Examiner* — Nathaniel E Wiehe
*Assistant Examiner* — Ket D Dang
(74) *Attorney, Agent, or Firm* — Hayes Soloway PC (57) ABSTRACT

A method for operating a plurality of devices which each contain at least one electrical or gas consumer, with the following steps: before switching on the consumer, the device asks an allocation module whether the process can be started, on the basis of parameters of the requested process, parameters of currently running and/or planned processes of the other consumers and a predefined maximum power value, the allocation module decides whether the requested process is enabled, modified or at least temporarily disabled. A system having a plurality of devices which each have at least one electrical or gas consumer as well as a controller, and having an allocation module in which a maximum power value for the consumers is stored, wherein the controller of the devices can send information about planned and current processes via a communication link to the allocation module and receive an enable signal.

18 Claims, 3 Drawing Sheets

(51) Int. Cl.
*H02J 3/14* (2006.01)
*H05B 1/02* (2006.01)

(58) Field of Classification Search
CPC ...... H02J 2310/60; H02J 3/14; H05B 1/0258;
Y02B 70/30; Y02B 70/3225; Y04S
20/222; Y04S 20/242
USPC .......................................................... 99/338
See application file for complete search history.

(56) References Cited

U.S. PATENT DOCUMENTS

| | | | | |
|---|---|---|---|---|
| 2008/0136581 A1* | 6/2008 | Heilman | ............... | H05B 6/688 |
| | | | | 340/3.1 |
| 2009/0236333 A1 | 9/2009 | Ben-Shmuel et al. | | |
| 2012/0150463 A1* | 6/2012 | Ozawa | ................... | G05B 15/02 |
| | | | | 702/62 |
| 2014/0158679 A1 | 6/2014 | Moon et al. | | |
| 2015/0187027 A1 | 7/2015 | Lowe | | |
| 2016/0359325 A1* | 12/2016 | Kawata | ............... | H04L 12/2829 |
| 2019/0115785 A1* | 4/2019 | Kallamkote | .......... | H04L 67/125 |

FOREIGN PATENT DOCUMENTS

| | | | | |
|---|---|---|---|---|
| CN | 104137384 A | 11/2014 | | |
| CN | 104703856 A | 6/2015 | | |
| CN | 105723153 A | 6/2016 | | |
| CN | 102621900 A | 12/2016 | | |
| CN | 105493629 A | 5/2018 | | |
| DE | 19902997 A1 | 8/2000 | | |
| DE | 2868979 | * 5/2015 | ................ | F24C 7/08 |
| EP | 1067650 A1 | * 1/2001 | ................ | H02J 3/14 |
| EP | 2061131 A1 | 5/2009 | | |
| EP | 2868979 A | 5/2015 | | |
| GB | 2535712 A | 8/2016 | | |
| WO | 2009103258 A2 | 8/2009 | | |
| WO | 2016076008 A | 5/2016 | | |

* cited by examiner

METHOD FOR OPERATING A PLURALITY OF DEVICES HAVING ELECTRICAL CONSUMERS OR GAS CONSUMERS, AND SYSTEM HAVING A PLURALITY OF SUCH DEVICES

CROSS-REFERENCE TO RELATED APPLICATIONS AND PRIORITY

This patent application claims priority from International Patent Application No. PCT/EP2017/082053 filed Dec. 8, 2017, which claims priority from DE Patent Application No. 10 2016 125 572.6 filed Dec. 23, 2016, which are herein incorporated by reference in their entirety.

FIELD OF THE DISCLOSURE

The invention relates to a method for operating a plurality of devices having electrical consumers or gas consumers, and a system having a plurality of such devices.

BACKGROUND

In the case of commercial customers of power companies, electricity or gas is usually consumed in such quantities that the energy suppliers use the consumption metering method for billing. This is standard for businesses using more than 100 MWh. The quantity of energy consumed (in kWh) is measured and divided per 15-min. time interval, and the resultant kW value is used as the basis for the demand charge (the total electricity rate is made up of the energy charge and the demand charge). The determined peak value is used as the basis for the entire month. If a high kW value is required only once, the total costs increase. In order to prevent this, so-called load shedding circuits are known. These are used to limit the max. power consumption.

However, the maximum possible volumetric flow rate of a gas connection line can also result in less gas than is precisely required being available at a particular point in time. This problem can arise in particular when a building with an existing gas connection is equipped with new, more powerful devices which have a higher gas consumption.

A disadvantage is that the limitation can possibly have a negative effect on the processes for which the devices are used. If, for example, they are cooking devices, it is necessary to prevent an ongoing cooking process from being interrupted or stopped at a disadvantageous point in time.

In DE 199 02 997 A1 a method is described with which a load shedding circuit can be bypassed by supplying a device which is not to be switched off at particular times with energy separately from the load shedding circuit for these times. However, this results in a high outlay when connecting the devices.

SUMMARY

An object of the invention is to operate a plurality of devices within a predefined limit of the maximum power consumption, without the need for a load shedding circuit and without the reaching of the maximum power consumption having a negative effect on the operation of the devices.

To achieve this object, in a method for operating a plurality of devices which each contain at least one electrical consumer or gas consumer, the following steps are provided: before it switches on the consumer, the device asks an allocation module whether the process can be started. On the basis of parameters of the requested process, parameters of currently running and/or planned processes of the other consumers and a predefined maximum power value, the allocation module decides whether the requested process is enabled, modified or at least temporarily disabled. To achieve this object, a system is also provided, having a plurality of devices which each have at least one electrical consumer or gas consumer as well as a controller, and having an allocation module in which a maximum power value for the consumers is stored, wherein there is a communications link between the controller of the devices and the allocation module via which the controllers can send information about planned and current processes and receive an enable signal.

The invention is based on the basic idea that the devices together reach an intelligent agreement as to when which consumer (thus electrical consumer or gas consumer) is operated with what power in order not to exceed a predefined maximum power value. For this, the devices are networked with each other, with the result that, using different parameters suitable for the respective intended purpose, it can be agreed what process takes precedence over other processes and, conversely, what process is modified or subordinated.

The parameters of the currently running and/or planned processes can be at least one of the following parameters: remaining cooking time, power required for the cooking, power required for the heating-up or preheating. In principle, it can be any parameter which is helpful for the decision as to whether a new process can currently be started or whether the power consumption can be at least reduced in at least one of the currently running processes such that a new process can be started as far as the predefined maximum power value is concerned.

The allocation module can be present physically as a control module. It is also possible to implement the allocation module purely as software, which need not be a constituent of one of the devices.

According to an embodiment of the invention, the allocation module can access a database in which power data and power profiles for different processes are stored. The power data can be the typical energy consumption of the consumers over the course of the day. For example, if the consumers are such as are present in a pub or a restaurant, the power data can show that all deep fat fryers are usually in use around lunchtime. The power data can also show that the dishwasher is usually switched on shortly after lunchtime. In the case of a bakery, the fact that all baking ovens are preheated early in the morning can be stored. What electrical power or what gas consumption is demanded during a specific process is stored in the power profiles. For the process of cooking "roast pork" for example the fact can be stored that a comparatively low power is necessary for the majority of the cooking process, while a high heating power is necessary shortly before the end of the cooking process in order to produce the desired crackling.

On the basis of the power data and power profiles, the allocation module can then make different intelligent decisions. For example, if several baking ovens need to be preheated, some of the baking ovens can be switched on earlier so that they heat up before other baking ovens and then only need to maintain a particular temperature. The allocation module can also disable a new process if, although the predefined maximum power value would not currently be exceeded with the new process, it is clearly recognizable that the maximum power value would inevitably be exceeded later because of two or more processes running in parallel and at least partially overlapping, for example because the processes towards the end involve a high power consumption.

A modified enabling can consist of starting or carrying out the requested process with reduced power. This relates in particular to those processes in which there is no negative effect on the later result if only a reduced power is enabled. This relates, for example, to the preheating of a baking oven; the baking oven can be preheated with reduced power which only has the result that the preheating lasts a little longer overall. A modified enabling can also consist of starting the requested process only when the power consumption of at least one other process has been reduced. In this case, the corresponding consumer waits until it receives a corresponding signal. For example, the preheating of a baking oven can be enabled only when a currently running heating-up process of the dishwasher has been concluded.

It is also possible for the allocation module to have such an effect on currently running processes that they are allocated a reduced power consumption. For example, the currently running heating-up of a baking oven can be impinged upon such that the enabled power is reduced. This makes it possible to start a requested process immediately, rather than only when the baking oven has heated up completely.

According to an embodiment of the invention it is provided that a process is at least partially brought forward as a modified enabling. This can occur in particular taking into account the stored power data and power profiles if the allocation module recognizes that particular processes should be brought forward, namely into phases with low power consumption of other processes, in order that a "congestion" is later prevented.

According to a preferred embodiment of the invention the devices make a decision as to which of them implements the allocation module according to predefined rules. In other words: the allocation module is implemented as a dynamic master. For this purpose, the controllers of the consumers are preferably set up such that the function of the allocation module can be taken over by several or even all of the controllers of the consumers. This has the advantage that no additional "central" allocation module is needed. Moreover, a redundancy results to the effect that the allocation module can be implemented flexibly in a suitable controller in each case of the different controllers.

For example, the function of the allocation module is taken over by the controller of another consumer if the consumer the controller of which is currently implementing the allocation module is switched off. One of the predefined rules according to which the decision is made as to which controller currently implements the allocation module can be for example the available processing power. Another rule can be which consumer is expected not to be switched off over a predetermined period of time.

It can be provided that it is initially established which electrical device implements the allocation module, and that the allocation module is newly "assigned" if this appears to be appropriate because of altered basic conditions.

As an alternative to the variant that the allocation module is implemented in the controllers, it can also be provided that each of the devices is provided with an allocation control module separate from the controller, which is activated as required and otherwise "sleeps".

The allocation module can also be a server application, for example a cloud-based server application. In this case a comparatively high processing power can be made available at low cost. It is also possible at low cost to update the algorithms used by the allocation module at comparatively low cost.

According to an aspect of the invention the allocation module can override the predefined maximum power value if this appears to be indispensable in a particular situation. This decision can be the result of weighing the resultant higher costs for the energy supply on the one hand against the consequences resulting for a particular workflow if the predefined maximum power value is respected on the other hand.

If the allocation module overrides the predefined maximum power value, it is conceivable that the peak value then resulting for the electrical power is stored and used as a new maximum power value in the further sequence for the current accounting period as, for the further costs in the corresponding month, it is of no significance if a higher maximum power value is applied.

The allocation module can apply at least one of the following allocation strategies: "first in-first out", "precedence for short, power-intensive processes", "prioritization according to closest completion time", "complex prioritization".

In the "first in-first out" allocation strategy, no complicated decision strategies on the part of the allocation module are necessary; the different processes are simply executed in the sequence in which they are entered in the allocation module. The only interaction of the allocation module consists of enabling the next process only when there is a sufficient "power reserve" for the predefined maximum power value. In the example of a cooking process, all cooking processes are executed in the sequence of their start with the highest priority. A new allocation takes place only when the process started first has a reduced power requirement or is ended.

In the "precedence for short, power-intensive processes" allocation strategy, there is the advantage that longer-lasting processes do not result in other, very short processes being blocked over a long period of time. Instead, it can usually be assumed that with respect to a desired result it is not as serious if longer-lasting processes are interrupted or delayed for a short period of time in order that very short, power-intensive processes can be executed.

The "prioritization according to closest completion time" allocation strategy functions in a result-oriented manner to the effect that those processes which need to be completed next for particular reasons (superordinate in certain circumstances) take precedence, for example because other processes build on them and otherwise the entire production process is disadvantageously influenced.

Finally, with the "complex prioritization" allocation strategy all cases in which a flexible response to particular results is needed can be covered. This can be indicated for example by providing processes with a classification number which reflects their priority. This classification number can take into account, for example, how seriously a time delay or a modified enabling affects the result of the process or other processes which build on the respective process. The classification number can also change dynamically, for example because other events have taken place in the interim, because of which the urgency has increased that a particular process is executed. For example, the start of a washing process of a dishwasher can initially have a very low priority, but this can increase over time if, because of the power requirement of other devices, the dishwasher has not received an enabling for a long period of time and accordingly the clean dishes eventually threaten to run out.

As an alternative to classification numbers, the different processes can also be allocated to a particular category of priority, for example a group A with highest priority, a group B with slightly lower priority, a group C with low priority and a group D with lowest priority. This procedure simplifies the management of the pending processes as there is no infinitely fine gradation (in the form of the classification numbers).

If there are so many pending cooking processes within the same category of priority that the power limits would be exceeded with them, additional criteria must be used for the prioritization, for example the next target completion time.

In the example of a cooking process, in the "complex prioritization" allocation strategy the overall aim can be pursued that the power is distributed such that there is no loss of cooking quality. The heat requirement requested by the cooking devices is therefore intelligently allocated such that overall the best outcome is guaranteed.

In the "complex prioritization" allocation strategy, if a cooking device is involved, the following priority viewpoints can be relevant: deviation from the cooking time expected by the user, effect on the cooking state, need for user interaction. In principle, it is preferred that the deviation from the cooking time expected by the user is as short as possible, in order that the user is irritated as little as possible and also that the workflow planned by them is compromised as little as possible. In terms of the effect on the cooking state, it is taken into account whether a delay or a modification of a process has effects on the cooking state or not. If effects are to be feared, the corresponding process has a high priority, with the result that it is carried out unchanged. For example, in the case of browning a certain minimum temperature is necessary, with the result that it is not an option to limit the power requirement for this process. In the case of processes for which a user interaction is needed, for example turning pancakes or steaks, a high priority results, in order that the user does not have to wait. Such processes are prioritized higher than others which can run in the background (and thus outside the user's focus).

The devices can in principle be all types having electrical consumers or gas consumers, which are energy-intensive and thus have a high power rating. In particular, they can be cooking devices, in particular combi steamers or pot-type cooking devices, and deep fat fryers. Where electrical consumers are involved, they can also be dishwashers, washing machines or cooling units.

It is also possible to group the devices so that different types of device have a higher or lower priority compared with other device types. Thus, for example, washing machines can have a lower prioritization than dishwashers, as it is usually less critical for the production sequence if a washing machine load is finished later than if clean dishes are available in order to be able to serve food.

According to an embodiment of the invention, a display unit is provided with which information about an available power and/or proposals for an altered sequence of processes can be displayed to a user. Remaining process times, as well as the effects of the start of an additional process on already running processes, can also be displayed to the user, with the result that either the user can prepare for the fact that a running process will be completed later or the user can manually prioritize an already running process higher, so that it is completed at a desired point in time.

It is also possible for the networked devices to automatically generate proposals for an altered sequence planning in order to enable peak electricity values that are as low as possible. The operator of the devices can also obtain sequences automatically altered by the specification of new values. Thus, a device, for example a thermal cooking device, can propose a later switch-on time if another device, for example the dishwasher, is currently heating up, or vice versa.

If the devices are cooking devices, the following demands should be made of the prioritization:
Fairness: No cooking process should be lengthened disproportionately while another is brought forward and thus can run without losses of time.
Balance: A cooking process should never be provided with disproportionately little heating power.
Adhere to rules: The priority number is calculated by all cooking devices according to fixed rules. The allocation of heat requirement is affected in the case of conflict, thus when otherwise the maximum power would be exceeded, according to the sequence of the list of priorities or is allocated proportionately to correspondingly weighted priority numbers.

The basis for the calculation of the priority number can be variable depending on the recipe step, for example with and without food to be cooked, with and without preheating, standby, cooking (with the sub-steps "browning" and "finishing").

Possible parameters of the priority number calculation can be:
Temperature of the food to be cooked or the deviation thereof from the target value
Temperature of the cooking chamber or auxiliary cooking medium or the deviation thereof
In the case of combi steamers: moisture or deviation from the target value
Remaining time of the cooking process or remaining time compared with the completion time defined by the user (for example priority number calculated on the basis of temperatures is weighted, thus multiplied, by for example (t remaining time+T_buffer)/T_time_until_completion time.)
Factors specific to the recipe step, for example when interactions by the user are required or immediately after loading of the cooking chamber.

BRIEF DESCRIPTION OF THE DRAWINGS

The invention is described below with reference to different embodiments, which are represented in the attached drawings. There are shown in.

DETAILED DESCRIPTION

Figure 1:
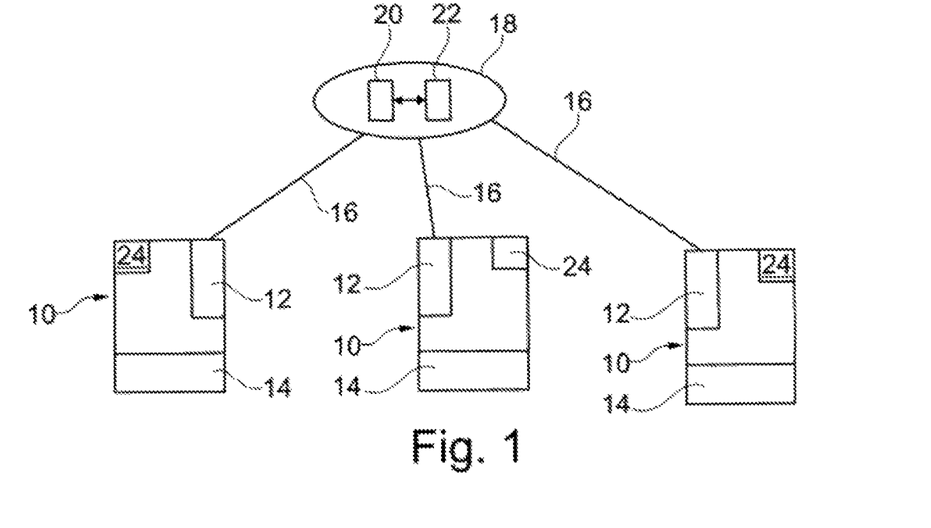
FIG. 1 a system having a plurality of devices according to a first embodiment.

In FIG. 1 three electrical devices 10 are represented, which each have a controller 12 and a consumer.

In the embodiment example below, electrical consumers are used for illustration. In principle, however, they can also be gas consumers for which there may be the problem of an insufficient supply of gas.

The electrical consumers 14 are components which have an electrical power requirement such that it determines the connected load of the device 10. The electrical consumers 14 are, for example, a heating device, with which air, water, oil, another medium or even another component of a device can be heated up. The electrical consumer can also be an electric motor or another electrical component.

The devices 10, more precisely their controllers 12, are linked to a stationary master 1, which here is implemented as a cloud-based server application, via a communications link 16.

Part of the master 18 is an allocation module 20 in which a predefined maximum power value is stored. This predefined maximum power value corresponds to the desired maximum power consumption of all devices 10 belonging to the system. This value is usually smaller than the totaled connected load of all devices 10 of the system.

The allocation module 20 can access a database 22 in which power data and power profiles of different processes which can run in the devices 10 are stored. Profiles relating to typical electrical consumption values throughout the day can also be stored.

Figure 3:
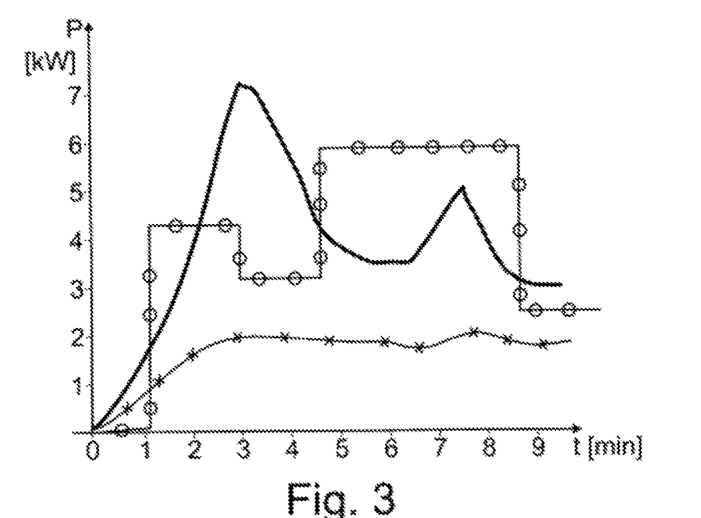
FIG. 3 a diagram with examples of possible load curves.

Examples of different power data and power profiles are shown in FIG. 3, in which by way of example the possible load curves are plotted for three different devices, namely a first device in a normal, continuous line, a second device in the line marked with crosses and a third device in the line marked with circles.

Figure 4:
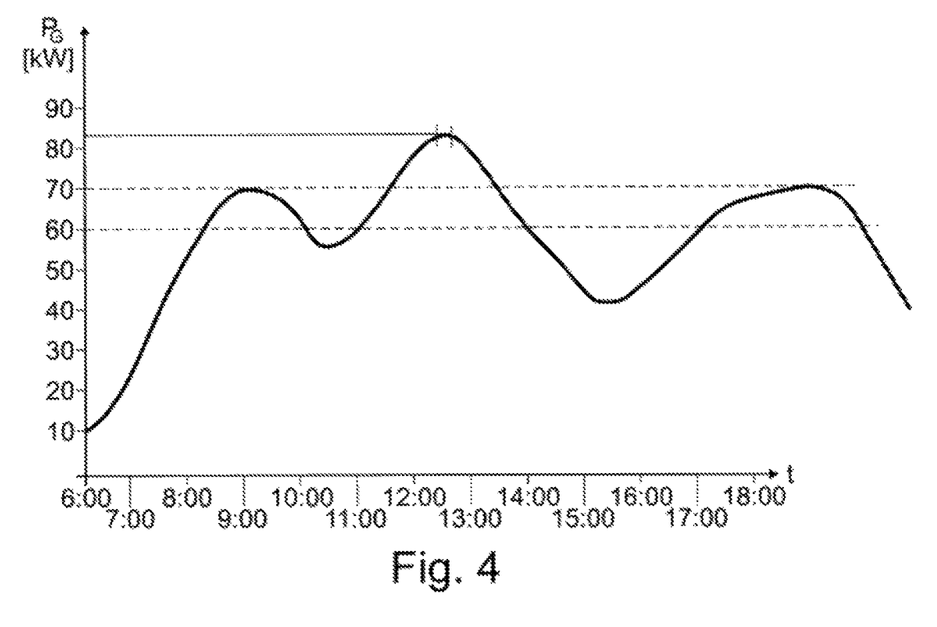
FIG. 4 a diagram with an example curve of the maximum load in the daily profile.

An example of the electrical consumption throughout the day is shown in FIG. 4. In this example the maximum electrical consumption is slightly above 80 kW, wherein this value is achieved only for a relatively short time around 13:00.

In FIG. 4 two examples of possible maximum power values are also drawn in dashed, namely one power value just above 70 kW and a second at 60 kW. It can be seen that, when the allocation module 20 allows a maximum power consumption of all devices 10 of slightly above 70 kW, this leads to a limitation over a period of only two hours a day. In return, in the billing of electric power consumption using the consumption metering method the peak value of over 90 kW is no longer used, rather slightly above 70 kW is used. This leads to a substantial saving.

If the maximum power value of for example 60 kW is used, it can be seen that this "compromises" the operation of the electrical devices 10 over three phases, namely in the mornings about 09:00, in the middle of the day from about 11:30 to 14:00 and in the evenings between 18:00 and 21:00. As a "counter value" for the reduced maximum power consumption of the devices 10, lower electricity costs result for the operator of the electrical devices.

In the embodiment example shown, the allocation module 20 serves to check the maximum power consumption of the devices 10 and optionally limit it. Expressed in general terms this occurs by each device 10 before it puts an electrical consumer 14 into operation, obtaining an enabling for this from the allocation module 20. The allocation module 20 decides, on the basis of the power consumption of the other devices, whether the enabling can be granted.

The allocation module 20 makes this decision not only on the basis of the current power consumption of the other consumers 14, but also taking into account the power consumption which will result in the future because of currently running processes. The corresponding values can be obtained from the database 22.

Figure 5:
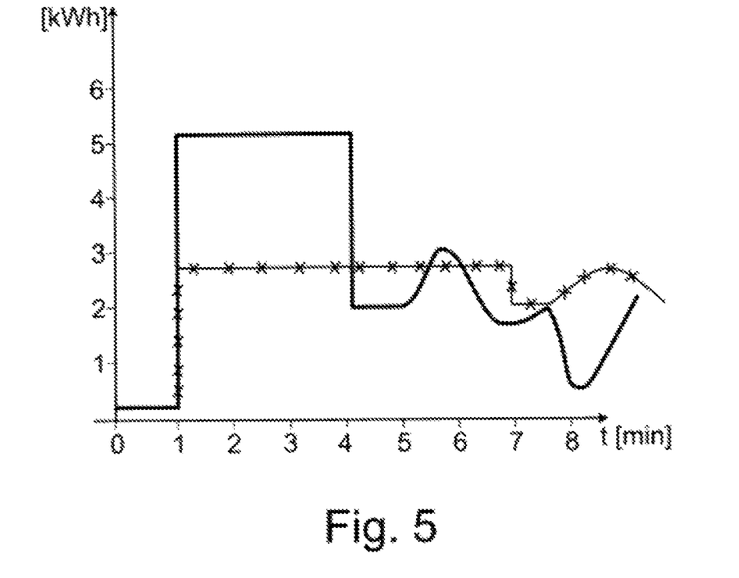
FIG. 5 a diagram of the energy required by a cooking device at full and half power.

An example of the power consumption of a cooking device is shown in FIG. 5, wherein the power consumption in a normal cooking program is represented by the continuous, normal line and the power curve for the same cooking program but operated at half power is represented in the line marked with crosses. It can be seen that in the case of operation at half power a first cooking process step, which corresponds to the heating up, lengthens, wherein the maximum power consumption is however reduced overall.

If the devices 10 are cooking devices, the allocation module 20 checks, for example, whether the currently requested new process, for example "roast pork", over the entire cooking time leads to a power consumption at which the predefined maximum power value is exceeded. A simulation of the power consumption of the devices corresponding to all currently requested and running processes is thus carried out in order to check whether the predefined maximum power value will be exceeded in the future.

If this is not the case, the new process is enabled.

If the new process would lead to the predefined maximum power value being exceeded, the allocation module 20 can respond in different ways.

In the simplest case, the newly requested process is not enabled but has to wait until at least one other process has been concluded or has entered a phase in which the power consumption is reduced.

In another scenario the allocation module 20 decides that the newly requested process either is enabled in a modified form, for example with reduced power consumption, or an already running process is being modified such that the power consumption there is reduced.

Figure 6:
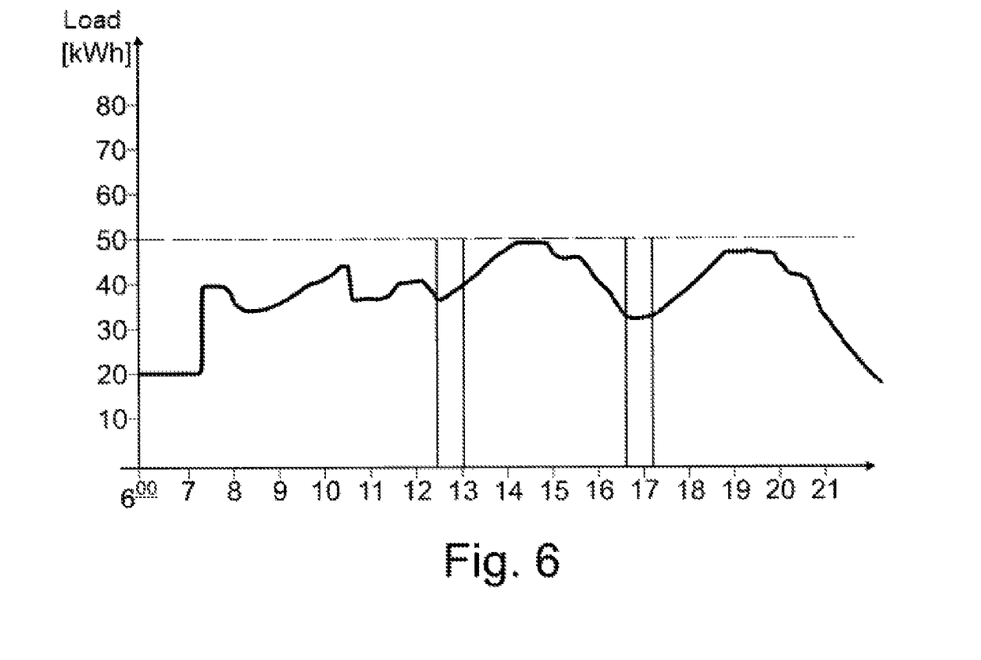
FIG. 6 a diagram of an example of usable load capacitances.

It is also possible for the allocation module 20 to newly organize the already running processes in their sequence or in future process sections in such a way that the newly requested process can already be enabled now. For example, the allocation module can decide to switch on the compressor of a cold room early, although this is not actually necessary for another hour, on the basis of the temperature profile, if the electrical power for the electric motor driving the compressor can thereby be "postponed" to a time segment in which load capacitances are still present. Such load capacitances are represented hatched in FIG. 6 by way of example in a diagram which represents the entire power consumption over one day.

Figure 2:
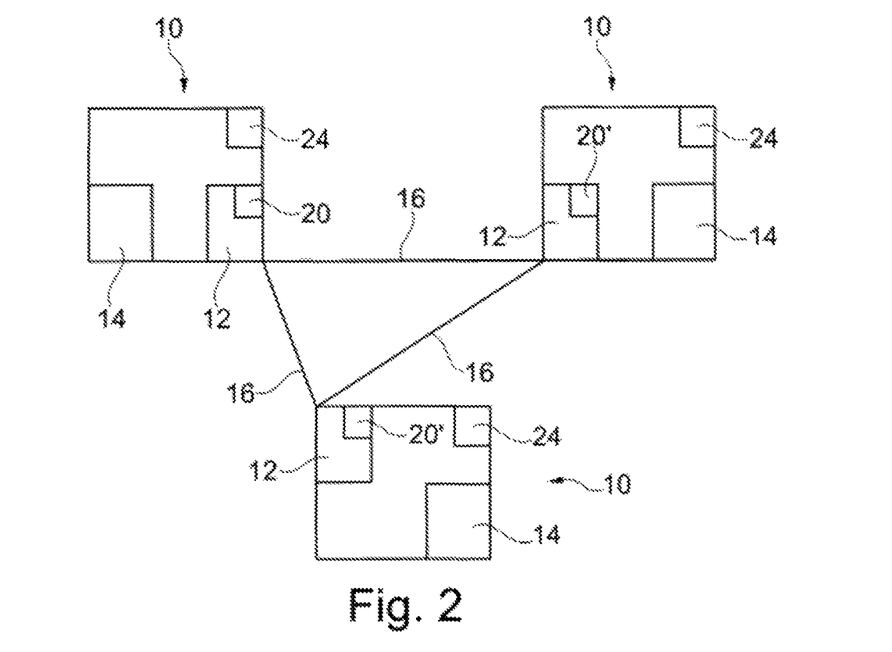
FIG. 2 a system having a plurality of devices according to a second embodiment.

FIG. 2 shows a second embodiment of a system having a plurality of devices 10. This differs from the first embodiment in that the allocation module 20 here can be implemented in each of the controllers 12. In the embodiment example shown, the allocation module is implemented in the device 10 shown at the top left here, while the inactive allocation modules 20' in the other two devices 10 are ready to take over the function of the active allocation module 20 at any time.

The allocation module 20 passes over from one device 10 to another device 10 for example when the device 10 which is currently implementing the allocation module 20 is switched off. Another event which can trigger a change of the allocation module 20, is for example when a particularly processing-intensive operation needs to be carried out in the controller which is currently implementing the allocation module 20, because of which it appears to be advantageous to "free up" the processing power tied up until now for the implementation of the allocation module 20.

On each of the devices 10 a display device 24 can be provided, with which the usual operating parameters can be displayed and which can also be used as an operator interface for a user. By means of the display device 24 the user can also affect or access the allocation module 20 to the effect that the prioritization of particular processes is influenced. For example, if the devices 10 are cooking devices, an operator can mark a particular cooking process as necessarily to be brought forward if it is indispensable for the further sequence that the food to be cooked is finished at a particular point in time.

Unless an operator intervenes manually, the allocation module 20 can decide, on the basis of stored features, which processes are to be prioritized over other processes. Here, in particular, the effects in practice are decisive. For example, the operation of a coolant compressor with which a cold store is cooled cannot be enabled only within certain limits. If the temperature in the cold store rises above a particular value, this can lead to a substantial financial loss. Another example is food which needs to be cooked under very precise conditions in order to achieve the desired result. For example, a certain temperature is indispensable for browning a steak. Here, the allocation module 20 must guarantee that the power needed for the browning is available at least for a comparatively short period of time. An example of the reverse situation is the heating-up of a dishwasher. The power and thus the speed at which the washing liquor is heated up have virtually no effect on the result of the washing process.

The invention claimed is:

1. A method for operating a plurality of devices which each contain at least one consumer of electricity, wherein the plurality of devices are networked and configured to automatically generate proposals for an altered sequence planning in order to enable peak electricity values that are as low as possible, with the following steps:
   before at least one of the plurality of devices switches on the consumer, the at least one of the plurality of devices asks an allocation module whether a process is to be started,
   on the basis of parameters of the requested process, parameters of currently running and/or planned processes of at least one other consumer and a predefined maximum power value, the allocation module decides whether the requested process is enabled, modified or at least temporarily disabled,
   wherein the currently running and/or planned processes are allocated to one of several categories of priority, wherein, when there are so many pending processes within the same category of priority that the predefined maximum power value would be exceeded with them, a next target completion time is used for prioritization,
   wherein the allocation module is configured to access a database in which power data for the currently running and/or planned processes are stored,
   wherein the power data comprise typical energy consumption of the at least one consumer over the course of a day.

2. The method according to claim 1, characterized in that the parameters of the currently running and/or planned processes comprise at least one of the following parameters: remaining cooking time, power required for the cooking, power required for the heating-up or preheating.

3. The method according to claim 1, characterized in that a modified enabling consists of starting or carrying out the requested process with reduced power.

4. The method according to claim 1, characterized in that a modified enabling consists of starting the requested process only when the power consumption of at least one other process has been reduced.

5. The method according to claim 1, characterized in that a modified enabling consists of at least partially bringing forward said process.

6. The method according to claim 1, characterized in that the at least one consumer makes a decision as to which of them implements the allocation module according to predefined rules.

7. The method according to claim 1, characterized in that the allocation module applies at least one of first in-first out, precedence for short, power-intensive processes, prioritization according to closest completion time, complex prioritization.

8. The method according to claim 7, characterized in that the at least one of the plurality of devices is a cooking device and in that in the complex prioritization allocation strategy, at least one of the following priority viewpoints is taken into account: deviation from a cooking time expected by a user, effect on a cooking state, and need for user interaction.

9. A system comprising a plurality of devices which each have at least one consumer of electricity as well as a controller, wherein the devices are networked and configured to automatically generate proposals for an altered sequence planning in order to enable peak electricity values that are as low as possible, and having an allocation module in which a maximum power value for consumers of the plurality of devices is stored, wherein there is a communications link between the controllers of the plurality of devices and the allocation module via which the controllers of the plurality of devices send information about planned and current processes and receive an enabling signal, wherein the planned and current processes are allocated to one of several categories of priority, wherein, when there are so many pending cooking processes within the same category of priority that the predefined maximum power value would be exceeded with them, a next target completion time is used for prioritization, wherein the system comprises a database in which power data for the planned and current processes are stored, wherein the power data comprise typical energy consumption of said consumers over the course of a day, wherein the allocation module is configured to access the database.

10. The system according to claim 9, characterized in that the allocation module is implemented as a stationary master.

11. The system according to claim 9, characterized in that the allocation module is a server application.

12. The system according to claim 11, characterized in that the allocation module is a cloud-based server application.

13. The system according to claim 9, characterized in that the allocation module is implemented as a dynamic master.

14. The system according to claim 9, characterized in that the devices come from at least one of the following device groups: cooking device, dishwasher, washing machine, and cooling unit.

15. The system according to claim 9, characterized in that a display device is provided, with which information about an available power and/or proposals for an altered sequence of said planned and current processes is displayed to a user.

16. A system comprising:
   at least one allocation module, wherein the allocation module comprises software;
   a plurality of devices, wherein each of the devices comprises:
      a consumer of electricity; and
      a local controller connected to the consumer and controlling operation of the consumer; and
   at least one bi-directional communication link between the local controller of each of the plurality of devices and the at least one allocation module, wherein each local controller of the plurality of devices communicates a status of the consumer that the local controller is controlling and the at least one allocation module communicates a change in the operation of said consumer, whereby the local controller connected to said consumer executes the change in operation of said consumer;

wherein the devices are networked and configured to automatically generate proposals for an altered sequence planning in order to enable peak electricity values that are as low as possible, wherein the allocation module is configured to override a predefined maximum power value and wherein the peak electricity value then resulting for electrical power is stored and used as a new maximum power value in a further sequence for a current accounting period, wherein different processes are allocated to one of several categories of priority, wherein, when there are so many pending cooking processes within the same category of priority that the predefined maximum power value would be exceeded with them, a next target completion time is used for prioritization.

17. The system of claim 16, further comprising a system master, the system master comprising the at least one allocation module and a database in communication with the at least one allocation module, wherein the at least one bi-directional communication link further comprises a plurality of bi-directional communication links connecting each of the local controllers of the plurality of devices to the at least one allocation module within the system master.

18. The system of claim 17, wherein the database comprises information for a current operation of each of the devices and future operation of each of the devices and wherein the allocation module communicates a change in the operation of one of said consumers to manage future consumption of electricity.

* * * * *